(12) United States Patent
Mi et al.

(10) Patent No.: US 7,006,184 B2
(45) Date of Patent: Feb. 28, 2006

(54) BEND ALIGNED NAMATIC LIQUID CRYSTAL IMAGING DISPLAY WITH COMPENSATION FILM

(75) Inventors: Xiang-Dong Mi, Rochester, NY (US); Tomohiro Ishikawa, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/122,080

(22) Filed: Apr. 12, 2002

(65) Prior Publication Data

US 2003/0193637 A1    Oct. 16, 2003

(51) Int. Cl.
*G02F 1/1337* (2006.01)

(52) U.S. Cl. ............... 349/130; 349/117; 349/118; 349/121; 349/123

(58) Field of Classification Search ............ 349/130, 349/117, 123, 118, 121
See application file for complete search history.

(56) References Cited

U.S. PATENT DOCUMENTS

| | | | | |
|---|---|---|---|---|
| 5,189,538 A | * | 2/1993 | Arakawa | 349/120 |
| 5,805,253 A | | 9/1998 | Mori et al. | |
| 5,883,685 A | | 3/1999 | Mazaki et al. | |
| 6,034,756 A | * | 3/2000 | Yuan et al. | 349/119 |
| 6,582,775 B1 | * | 6/2003 | Payne et al. | 427/508 |

FOREIGN PATENT DOCUMENTS

WO            01/20392           3/2001

\* cited by examiner

*Primary Examiner*—Robert H. Kim
*Assistant Examiner*—George Wang
(74) *Attorney, Agent, or Firm*—Arthur E. Kluegel

(57) ABSTRACT

Disclosed is a display comprising a bend aligned nematic liquid crystal cell, a polarizer, and a compensation film containing a positively birefringent material oriented with the optic axis tilted in a plane perpendicular to the liquid crystal cell surface plane. Such displays exhibit an improved viewing angle characteristic.

7 Claims, 13 Drawing Sheets

BEND ALIGNED NAMATIC LIQUID CRYSTAL IMAGING DISPLAY WITH COMPENSATION FILM

FIELD OF THE INVENTION

This invention relates to a display comprising a bend aligned nematic liquid crystal cell, a polarizer, and a compensation film containing a positively birefringent material oriented with its optic axis tilted in a plane perpendicular to the bend aligned nematic liquid crystal cell surface plane.

BACKGROUND OF THE INVENTION

Liquid crystals (LC) are widely used for electronic displays. In these display systems, an LC layer is typically situated between a polarizer layer and an analyzer layer. The analyzer is oriented such that its absorbing axis is perpendicular to that of the polarizer. Incident light polarized by the polarizer passes through a liquid crystal cell is affected by the molecular orientation in the liquid crystal, which can be altered by the application of a voltage across the cell. By employing this principle, the transmission of light from an external source, including ambient light, can be controlled. The energy required to achieve this control is generally much less than that required for the luminescent materials used in other display types such as cathode ray tubes. Accordingly, LC technology is used for a number of electronic imaging devices, including but not limited to digital watches, calculators, portable computers, electronic games for which light weight, low power consumption and long operating life are important features.

Contrast, color reproduction, and stable gray scale intensities are important quality attributes for electronic displays, which employ liquid crystal technology. The primary factor limiting the contrast of a liquid crystal display is the propensity for light to "leak" through liquid crystal elements or cell, which are in the dark or "black" pixel state. Furthermore, the leakage and hence contrast of a liquid crystal display are also dependent on the angle from which the display screen is viewed. Typically the optimum contrast is observed only within a narrow viewing angle centered about the normal incidence to the display and falls off rapidly as the viewing angle is increased. In color displays, the leakage problem not only degrades the contrast but also causes color or hue shifts with an associated degradation of color reproduction.

Current rapid expansion in the liquid crystal display applications in various areas of information display is largely due to improvements of qualities. One of the major factors measuring the quality of such displays is the viewing angle characteristic (VAC), which describes a change in a contrast ratio from different viewing angles. It is desirable to be able to see the same image from a wide variation in viewing angles and this ability has been a shortcoming with liquid crystal display. Also for a potential application of liquid crystal display for moving pictures, we need to have a display mode with a high-speed response.

A bend aligned nematic liquid crystal cell, also referred as an Optically Compensated Bend (OCB) cell 50, is a nematic liquid crystal cell based on the symmetric bend state. In its actual operation, the brightness of the display using the bend aligned nematic liquid crystal cell 50 is controlled by an applied voltage or field that leads to a different degree in the bend orientation as shown in FIG. 1A and FIG. 1B. It has advantages in VAC and response speed over conventional displays, such as Twisted Nematic mode. The fast response is the results of switching between the different bend states; changing from one bend to another does not cause a reverse torque that prevents a fast rotation of liquid crystal molecules at the middle of the cell. The better VAC with a proper compensation is due to the symmetric molecular arrangement inside of the liquid crystal cell. In FIG. 1A and FIG. 1B, the liquid crystals 12 are sandwiched between two substrates 10. In the X-Z plane of the XYZ coordinate system 22, the liquid crystals 12 take the bend structure, which is symmetric around the cell mid plane 20. This bend structure is invariant in the Y direction. The ray 16 coming from left to right is close to perpendicular to the molecules at the bottom part 18 of the cell experiencing larger birefringence. In the upper part 24 of the cell, on the other hand, the ray 16 is nearly parallel to the molecules giving lower birefringence. The opposite happens to the ray 14 (traveling from right to left); lower (higher) birefringence in the bottom (upper) region of the cell. Therefore, the rays 14 and 16 experience the similar optical path. In another words, the OCB cell 50 has left-right symmetry. Since the OCB cell 50 operates entirely in the bend states, this symmetry holds with or without an applied field as indicated in FIGS. 1A and 1B. This fact indicates an intrinsically widened VAC, which is a stark difference from the conventional Twist Nematic mode. The Twisted Nematic mode does not maintain the aforementioned left-right symmetry.

As a reflective type OCB mode, one can use a Hybrid Aligned Nematic (HAN) liquid crystal cell 51 as shown in FIG. 1C. The HAN cell 51 has different boundary conditions such that the liquid crystals are vertically aligned at the bottom part 19 of the cell while they are tilted at the upper part 25 of the cell. This is really a half of the bend aligned nematic liquid crystal cell with a reflective plate 13 on one end. The principle of the operation of the HAN cell 51 is the same as that of the OCB 50 except that the light ray is reflected by the plate 13. The incoming ray 17A is nearly parallel to the liquid crystal at the top part 25 of the HAN cell 51, therefore it experiences a smaller birefringence. However, the reflected ray 17B is almost perpendicular to the liquid crystal at the top part 25 of the HAN cell 51 and sees a larger birefringence. Thus the HAN cell is operated in the same way as the OCB cell.

A practical application of bend aligned nematic liquid crystal cells, however, needs optical compensating means to optimize the VAC. Bend aligned nematic liquid crystal cells, similar to other modes, comprise of liquid crystal materials with an optical anisotropy and polarizers. Thus, the VAC suffers deterioration in contrast when viewed from oblique angles. Also, the bend state is not stable when a tilt of liquid crystal molecules is low at the cell substrates 10. Therefore, in order to maintain the bend orientation in the cell, one has to enforce a high tilt angle at the cell substrates 10. This leads to a high average refractive index in the direction normal to the cell surface plane (along the Z axis) and small one in the XY plane. Thus as a compensating film, one with the optic axis (the direction in which light does not see birefringence) lying in the film normal with negative out of plane birefringence (a negative C-plate) is effective to some extent. Other aspect of the compensation comes from the fact that the bend structure is contained in the XZ plane in FIGS. 1A and 1B. Unless an applied field is high enough to make the liquid crystals sufficiently perpendicular to the substrates 10, there appears a phase retardation in the XY plane. This in-plane phase retardation makes a C-plate compensator impossible to shield the light resulting in an unsatisfactory contrast ratio.

Uchida (Japanese Patent 07084254 A2, U.S. Pat. No. 6,108,058) and Bos (U.S. Pat. No. 5,410,422) used a biaxial plate and a negative C-plate to compensate the bend aligned nematic liquid crystal cell in a black state, respectively. FIG. 2 shows a prior art liquid crystal display 98 comprising a bend aligned nematic liquid crystal cell 50, a biaxial plate 34, and polarizers 32, 42. The biaxial plate 34, used to compensate the liquid crystal cell, had indices of refraction satisfying $n_y > n_x > n_z$ represented by an ellipsoid of index 36. It is placed between the bend aligned nematic liquid crystal cell 50 with a voltage source 38 and the top polarizer 32. Polarizers 32, 42 are crossed. The out of plane component of the phase retardation of the biaxial plate 34, $\{n_z - (n_x + n_y)/2\}d$, where d is a thickness of the biaxial plate 34, is negative and compensates the positive contribution from the cell. The in-plane component $(n_y - n_x)d$ would ensure a sufficiently dark state at the normal viewing angle with a finite applied voltage. This method improved the VAC of bend aligned nematic liquid crystal cells, yet the results remained unsatisfactory. The orientation of liquid crystal varies continuously along the Z-axis giving a change in the refractive index in the cell thickness direction. On the other hand, the index of refraction does not undergo any changes across the thickness in the above compensation films including both the biaxial plates and the negative C-plates.

Discotic liquid crystals consist of disk-like mesogenic molecules that are typically optically negative uniaxial materials. Uniaxial negative materials have three indices of refraction satisfying $n_3 < n_1 = n_2$, where $n_3$ is a refraction index in the direction of the optic axis. Utilizing these materials, Mazaki et al. (U.S. Pat. No. 6,124,913) and Mori et al. (U.S. Pat. No. 5,805,253) independently pursued the idea of compensating the bend aligned nematic liquid crystal cell. The compensation film was made from the discotic materials in which the direction of molecules varies in the thickness direction. The discotic film provides both in-plane phase retardation as well as effective out of plane negative retardation. By adjusting the discotic molecules direction inside of the film along with other parameters, they obtained widened VAC with bend aligned nematic liquid crystal cells.

While the above-mentioned methods have improved the viewing quality of the bend aligned nematic liquid crystal displays, the overall VAC remains poorer than it is desirable. It is a problem to be solved to provide a compensation film for a bend aligned nematic liquid crystal cell that improves the viewing angle characteristic of the display.

SUMMARY OF THE INVENTION

The invention provides a display comprising a bend aligned nematic liquid crystal cell, a polarizer, and a compensation film containing a positively birefringent material oriented with its optic axis tilted in a plane perpendicular to the liquid crystal cell surface plane. The invention also provides an electronic device containing the display of the invention as well as methods for preparing the display of the invention.

The invention enables an improved viewing angle characteristic.

DETAILED DESCRIPTION OF THE INVENTION

Reference will now be made to the drawings in which the various elements of the present invention will be given numerical designations and in which the invention will be discussed so as to enable one skilled in the art to make and use the invention.

Figure 1A:
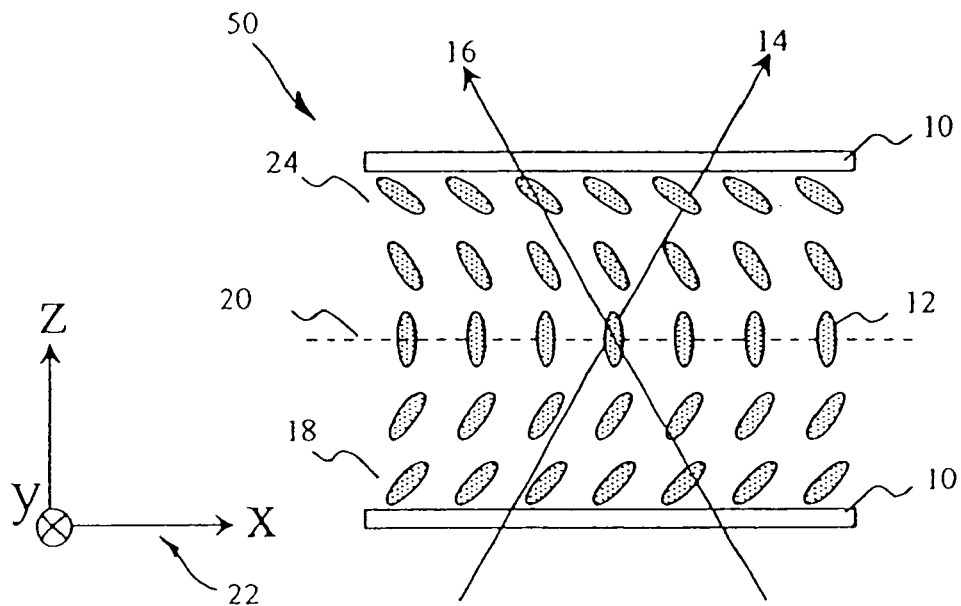
FIGS. 1A and 1B are schematics showing the operation of the bend aligned nematic liquid crystal cell display.
Figure 1B:
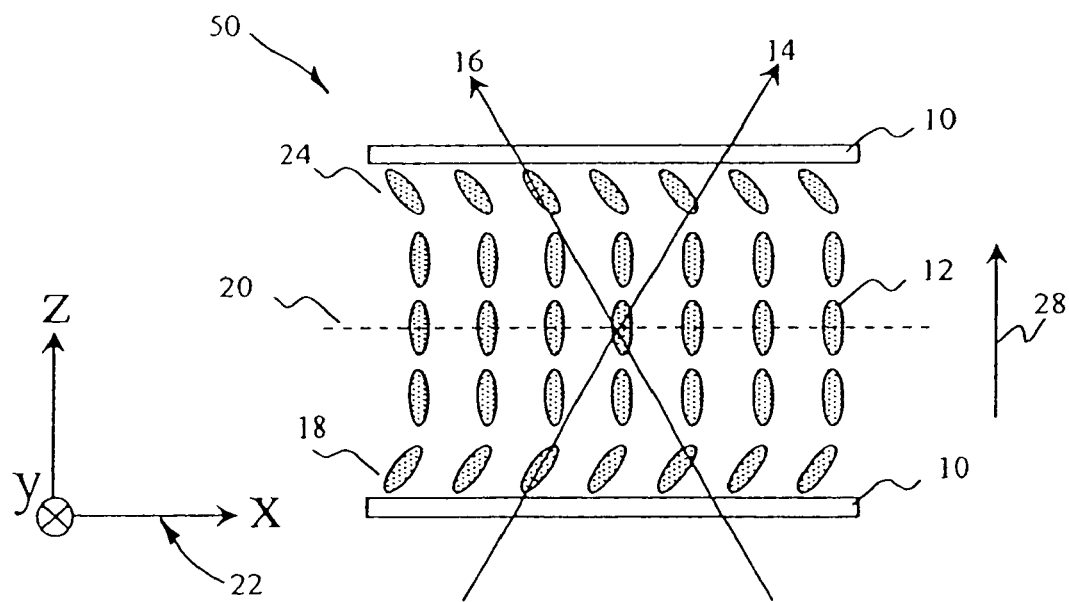
Figure 1C:
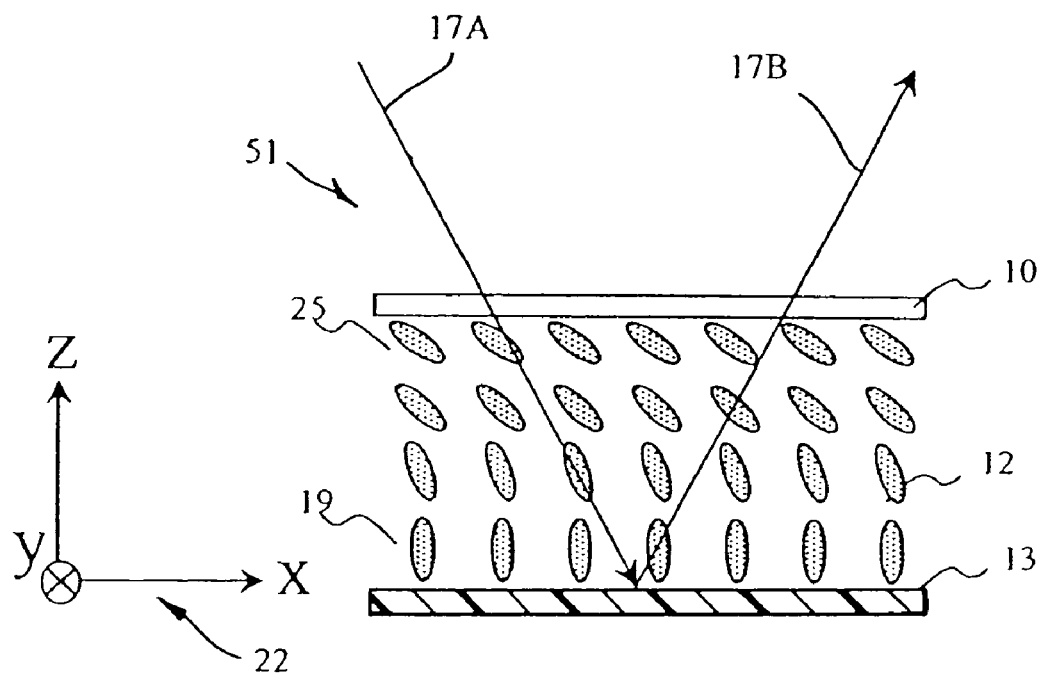
FIG. 1C is a cross sectional view of Hybrid Aligned Nematic liquid crystal cell (HAN cell).
Figure 2:
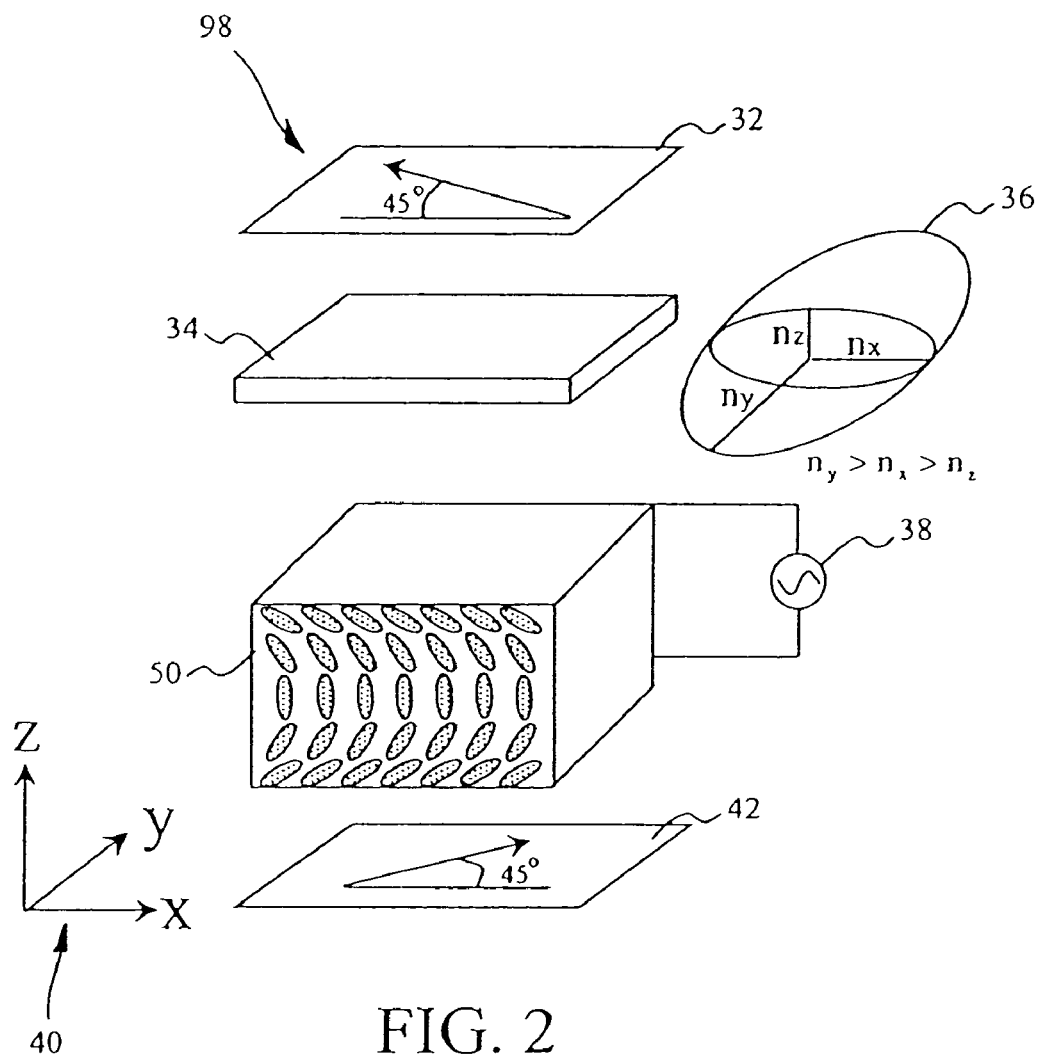
FIG. 2 is a schematic diagram of a prior art display device with a biaxial plate.

FIGS. 1A and 1B show the operation of a bend aligned nematic liquid crystal cell 50 in a cross sectional view. A bend aligned nematic liquid crystal cell 50 is one in which positively birefringent nematic liquid crystals 12 are oriented with the bend structure in a plane perpendicular to the cell surface plane (the X-Y plane). In the examples shown in FIGS. 1A and 1B, the liquid crystals 12 take the bend structure oriented in the X-Z plane, which is perpendicular to the liquid crystal cell surface plane (the X-Y plane). When the field is OFF, the liquid crystals 12 take the orientation in the cell as exemplified in FIG. 1A. FIG. 1B shows that when the field is ON, the liquid crystals 12 orient to the electric field direction indicated by the arrow 28. In the middle part of the cell, the liquid crystals 12 are almost perpendicular to the cell surface plane (the X-Y plane). The bend aligned nematic liquid crystal cell 50 shows symmetry for an optical ray such as 14 propagating in an oblique direction in a liquid crystal director plane (the X-Z plane) as described before. In the ON state, such as shown in FIG. 1B, a plate with negative out of plane phase retardation can be effective to compensate the vertically oriented portion of the cell. However, this does not accomplish complete compensation as the liquid crystals 12 at the bottom part 18 and upper part 24 near the substrates 10 experience a distortion. It is an object of this invention to compensate for the ON state of the bend aligned nematic liquid crystal cell to yield a high contrast in an extended viewing angle. As a result, one obtains a liquid crystal display with a wide viewing angle and fast response time. The compensation is achieved by providing a compensation film containing a positively birefringent material oriented with the optic axis tilted in a plane perpendicular to the liquid crystal cell surface plane.

Figure 3A:
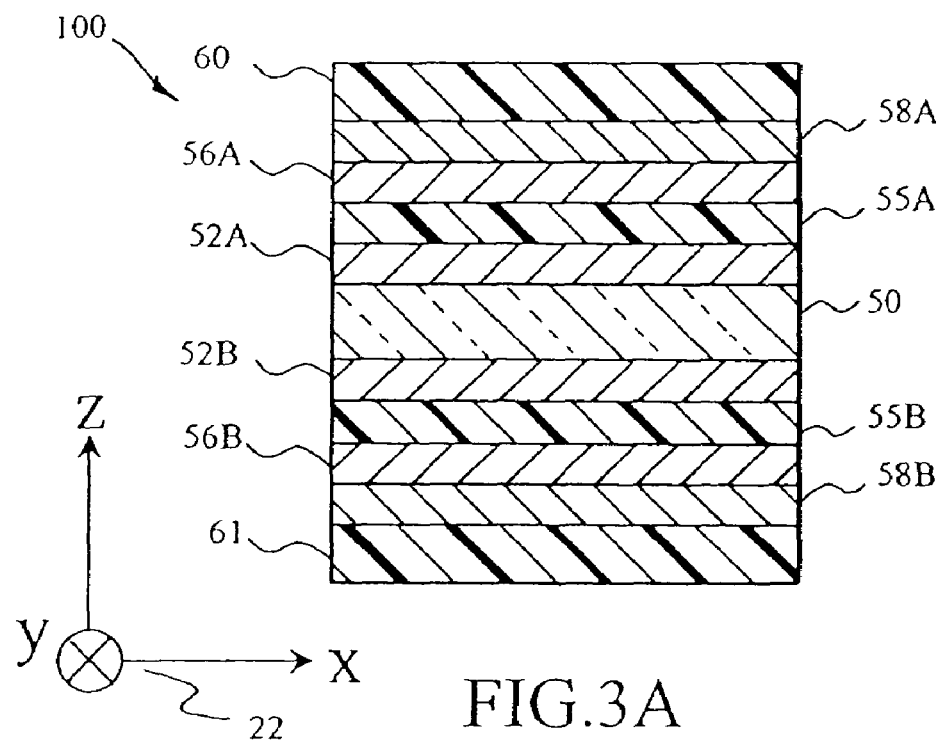
FIGS. 3A, 3B, 3C, and 3D are cross sectional diagrams of the exemplary displays in accordance with the invention.
Figure 3B:
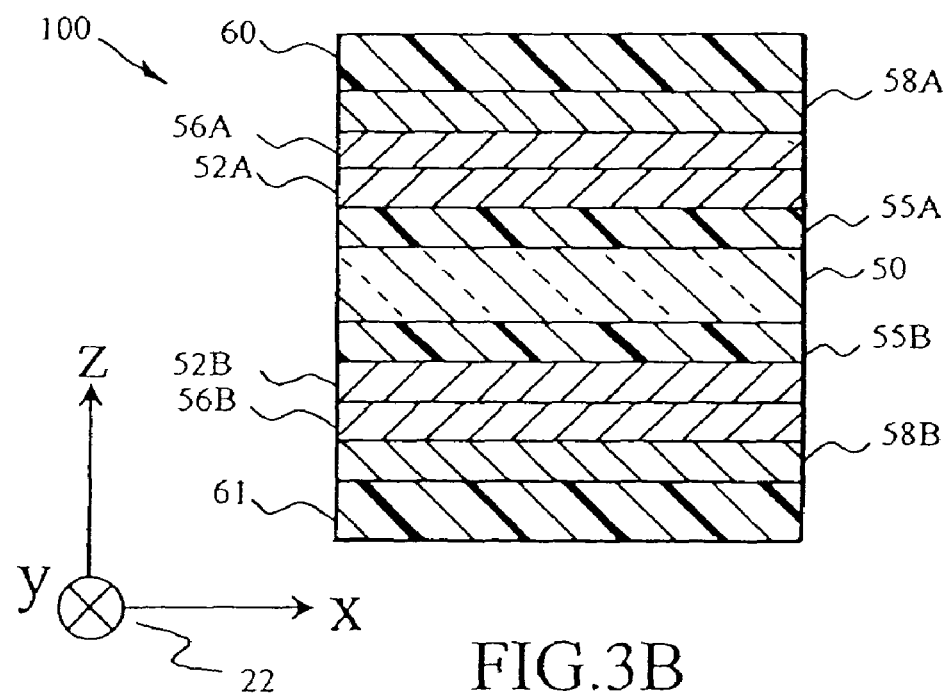
Figure 3C:
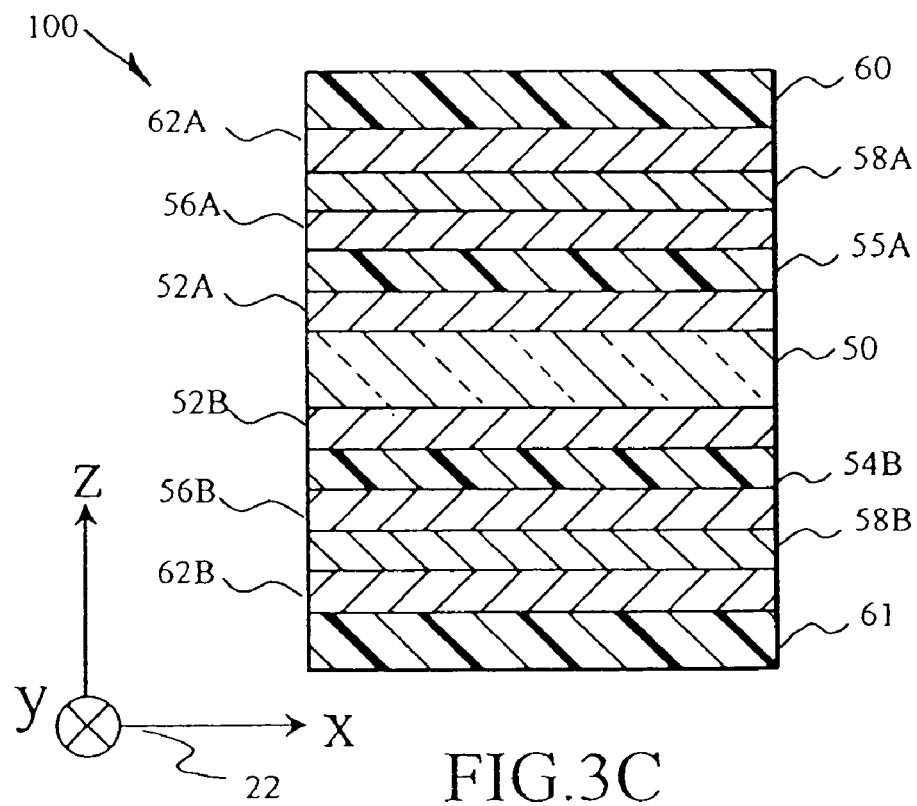
Figure 3D:
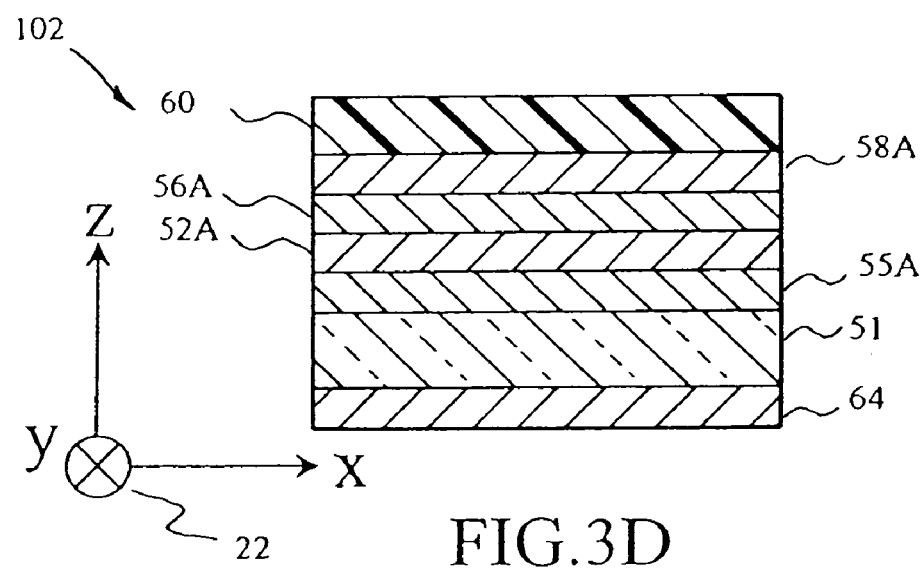

In FIG. 3A through 3D, possible configurations of the display 100 according to the invention are shown. A display 100 shown in FIG. 3A comprises a bend aligned nematic liquid crystal cell 50, the first pair of positive A-plates 52A, 52B, the second pair of positive A-plates 58A, 58B, a pair of negative C-plates 56A, 56R, the compensation films 55A, 55B and the crossed polarizers 60, 61, one on each side of the bend aligned nematic liquid crystal cell 50. The transmission axes of polarizers 60, 61 are orthogonally crossed with respect to each other in the X-Y plane. The angle between the transmission axes of polarizers 60, 61 is considered as orthogonal when it is within 85 to 95 degrees. The optic axes of the A-plates, 58A and 58R, are in the X-Y plane and parallel to the transmission axes of adjacent polarizers, 60 and 61, respectively. Compensation films, 55B and 55A, are placed between the negative C plates, 56A and 56B, and additional positive A-plates 52A and 52B, respectively. These positive A-plates 52A, 52B are placed next to the bend aligned nematic liquid crystal cell 50 such that their optic axes are in the Y-direction and are perpendicular to the X-Z plane in which liquid crystals are oriented. The function of the positive A-plates 52A, 52B is to offset the phase retardation due to projections of the liquid crystals in the X direction. The A-plate 52A (or 52B) can also be placed between the compensation film 55A (or 55B) and the negative C-plate 56A (or 56B) as shown in FIG. 3B. FIG. 3C is another example of the display 100 according to the invention. In this case, two positive C-plates (plates with its optic axis lying in the plate normal, namely in Z-direction, with positive birefringence) 62A and 62B are placed next to the polarizers 60 and 61, respectively. The optic axes of the positive A-plates 58A, 58B are placed perpendicularly to the transmission axes of their nearer polarizers. The C-plates 62A, 62B and A-plates 58A, 58R can be both negative instead of being both positive. Compensation films, 55R and 55A, are sandwiched by negative C-plates 56A, 56B and positive A-plates 52A, 52B for phase retardation offset, respectively. The placement of the offset A-plates 52A, 52B can be altered, as is the case in FIGS. 3A and 3B. FIG. 3D shows a reflective type display 102 in accordance with the present invention comprising the hybrid aligned nematic liquid crystal cell 51, the reflective plate 64, and the compensation film 55A. The C-plate 56A and the A-plate 58A are arranged so as to compensate the polarizer 60.

Now the actual inner structure of the compensation films 55A and 55B is described. Each of the compensation films 55A and 55B in accordance with this invention has two or more optically anisotropic layers disposed on the base film as 78 shown in FIG. 5A through FIG. 6D. The optical property of the base film is close to that of a uniaxial negative C-plate or an isotropic material. The base film can also be a biaxial one with $|n_x-n_y|<<n_z$. In case of isotropic films, all three of indices of refraction are equal. However, for simplicity, the base film 78 is considered as isotropic films in all exemplary devices 100 and 102, because its retardation can be added into its adjacent A-plates or C-plates if it has any birefringence.

Figure 4A:
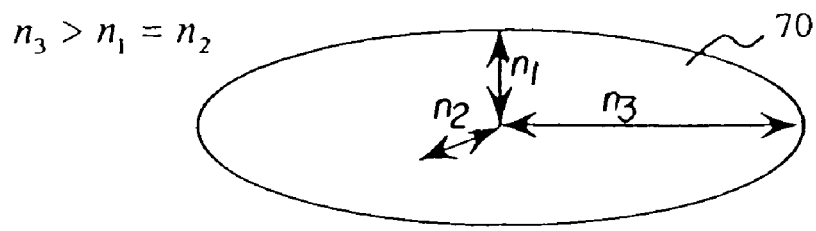
FIG. 4A shows a positively birefringent ellipsoid of index representing the constituent material for the anisotropic layer disposed on the base film.
Figure 4B:
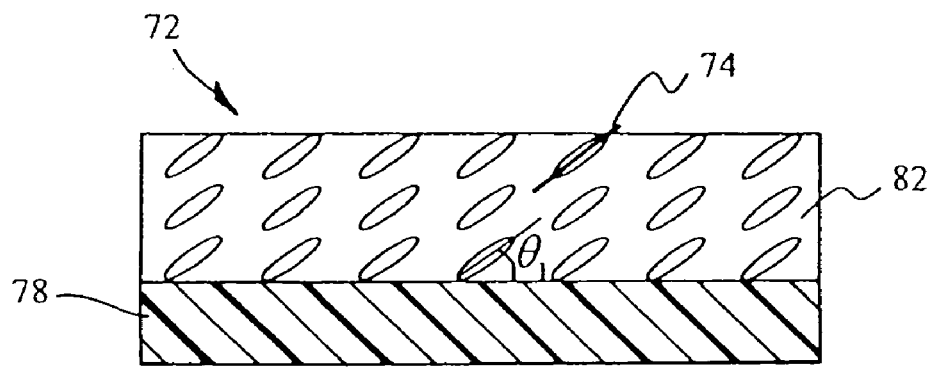
FIG. 4B shows that the optic axis is tilted uniformly in the thickness direction.
Figure 4C:
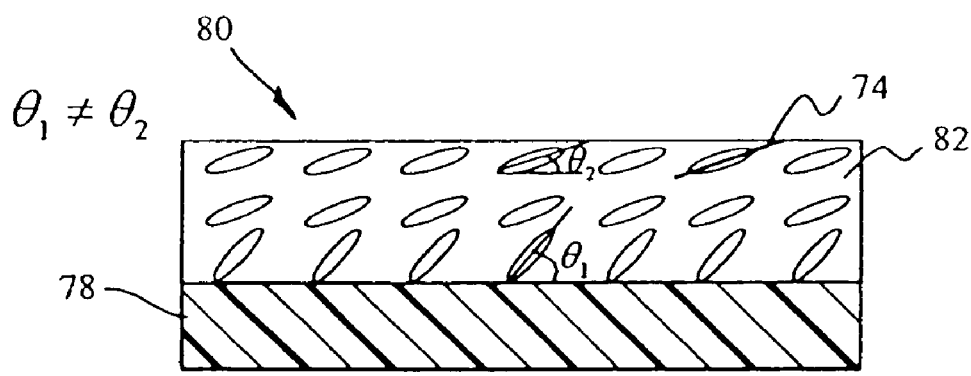
FIG. 4C shows that the optic axis varies in the thickness direction.

The anisotropic layers contain a material with an optical property of uniaxial or biaxial nature. The direction of the optic axis of the material is fixed in one azimuth angle on the film plane. The azimuth is fixed by an alignment layer (not shown) between the base film 78 and a layer of the optically anisotropic material 82. In the case of a material with the uniaxial nature, it has two equivalent indices $n_1$ and $n_2$ that are smaller than $n_3$ represented by index of ellipsoid 70 as shown in FIG. 4A. In this case, the direction of the optic axis corresponds to that of the maximum refraction index, $n_3$ and the material is positively birefringent. In the biaxial case, all of n's assume different values and the optic axis does not necessarily lie on the direction of the largest n's. FIGS. 4B and 4C show films 72 and 80, which are part of the compensation film 55 because there are shown only a single anisotropic layer 82. In both films 72 and 80 a single anisotropic layer 82 is deposited on the base film 78. The tilt $\theta_1$ in the optic axis 74 is uniform while in FIG. 4C its direction varies from $\theta_1$ to $\theta_2$ in a plane perpendicular to the base film 78. FIG. 4C shows the case $\theta_2>\theta_1$ but the opposite one $\theta_2<\theta_1$ is also possible.

Figure 5A:
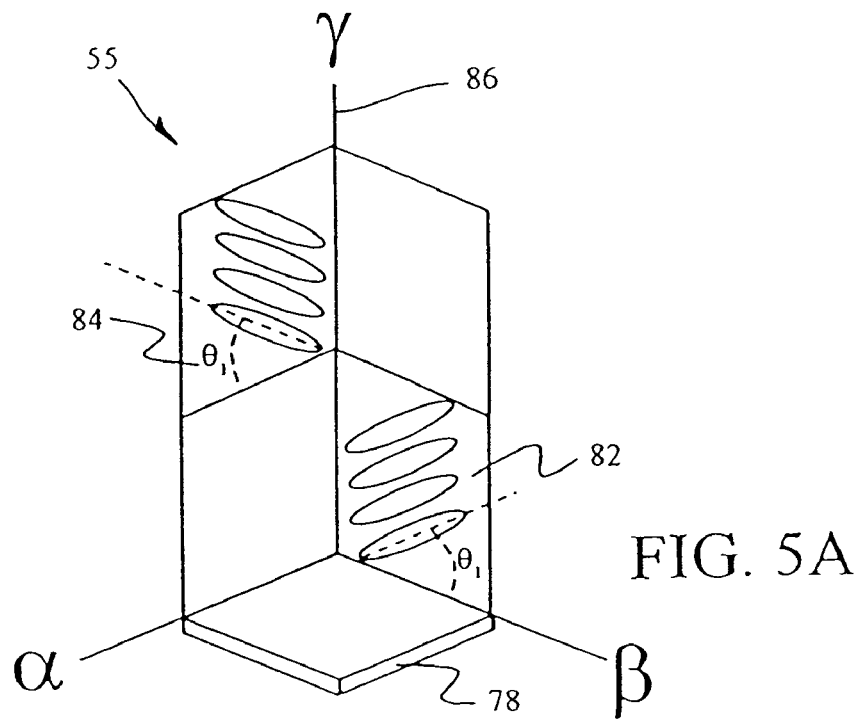
FIGS. 5A and 5B show structures of compensation film with uniform tilt in optic axis. They are equivalent through the 90° rotation around the γ axis.
Figure 5B:
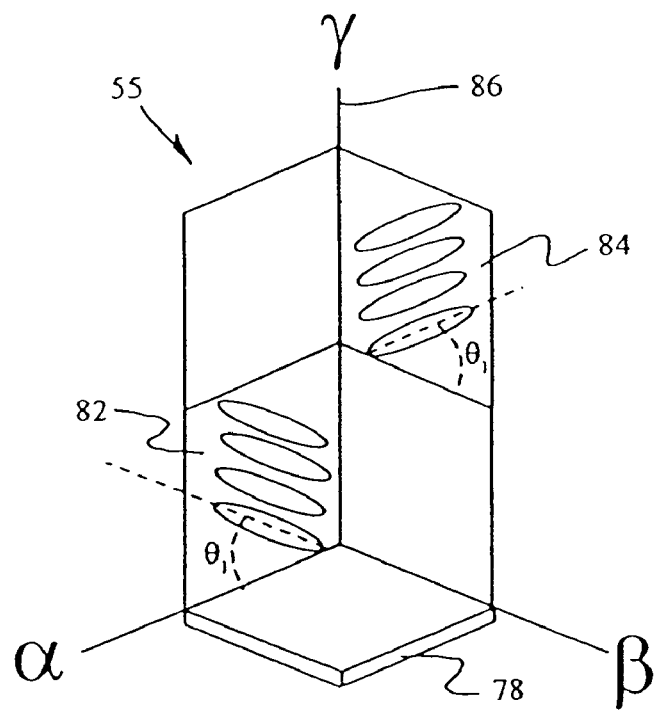

FIGS. 5A, 5B, 6A, 6B, 6C, and 6D are schematics of various exemplary compensation films 55, each of which can be used in place of the compensation films 55A and 55B shown in FIGS. 3A, 3B, 3C, and 3D. In every case, the compensation film 55 contains two anisotropic layers 82, 84 deposited on the base film 78. The $\alpha$, $\beta$, and $\gamma$ axes are perpendicular to each other and form an orthogonal coordinate system 86 attached to the compensation film 55. The tilt $\theta_1$ in the optic axis inside of the anisotropic layers 82, 84 is uniform along the $\gamma$ axis in FIGS. 5A and 5B. In FIG. 5A, the optic axis in the bottom anisotropic layer 82 (adjacent to the base film 78) is contained in the $\beta$-$\gamma$ plane while it remains in the $\alpha$-$\gamma$ plane in the top anisotropic layer 84. FIG. 5B is the other way around.

Figure 6A:
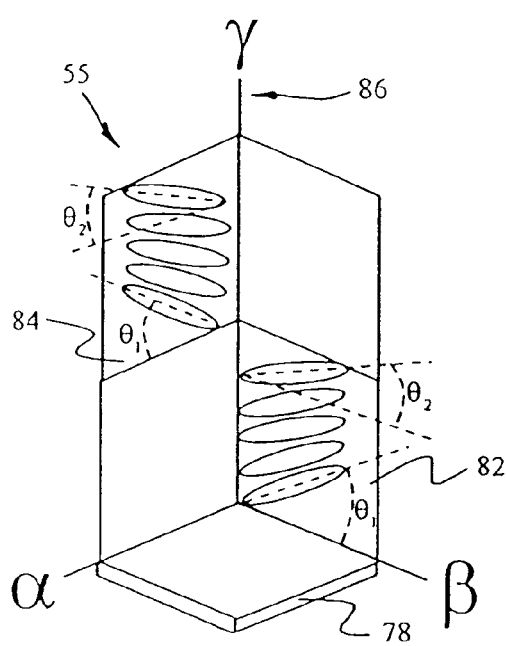
FIGS. 6A, 6B, 6C, and 6D show four structures of compensation films with varying direction in the optic axis.
Figure 6B:
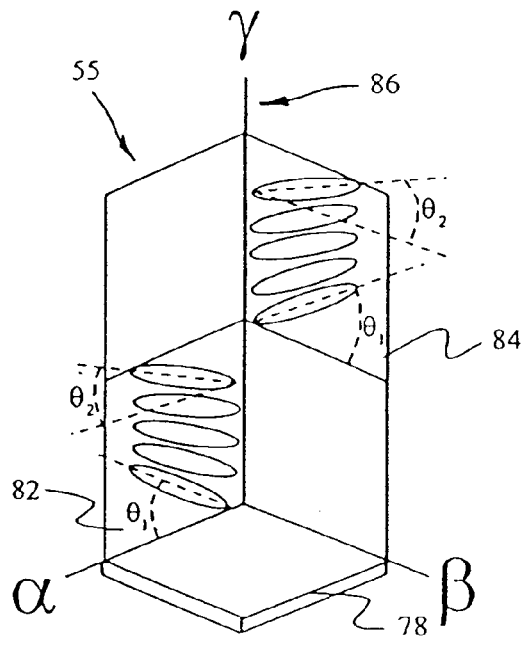
Figure 6C:
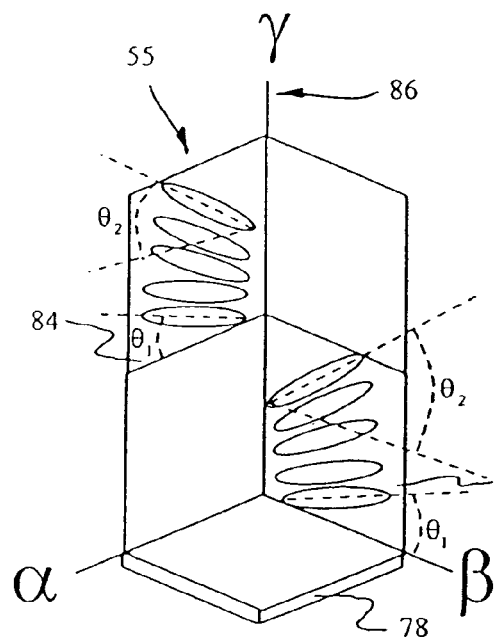

FIGS. 6A, 6B, 6C, and 6D illustrate compensation films 55 with two anisotropic layers 82, 84 in which the tilt in the optic axis varies along the $\gamma$ axis. Again, the $\alpha$, $\beta$, and $\gamma$ axes are perpendicular to each other and form the orthogonal coordinate system 86. In FIGS. 6A and 6C, the optic axis in the bottom anisotropic layer 82 is in the $\beta$-$\gamma$ plane while it is in the $\alpha$-$\gamma$ plane in the top layer 84. It is opposite for FIGS. 6B and 6D; the $\alpha$-$\gamma$ plane for the bottom 82 and the $\beta$-$\gamma$ for the top layer 84. The tilt $\theta$ decreases from $\theta_1$ to $\theta_2$ ($\theta_1>\theta_2$) in the positive $\gamma$ direction in FIGS. 6A and 6B while it increases in FIGS. 6C and 6D.

Figure 7A:
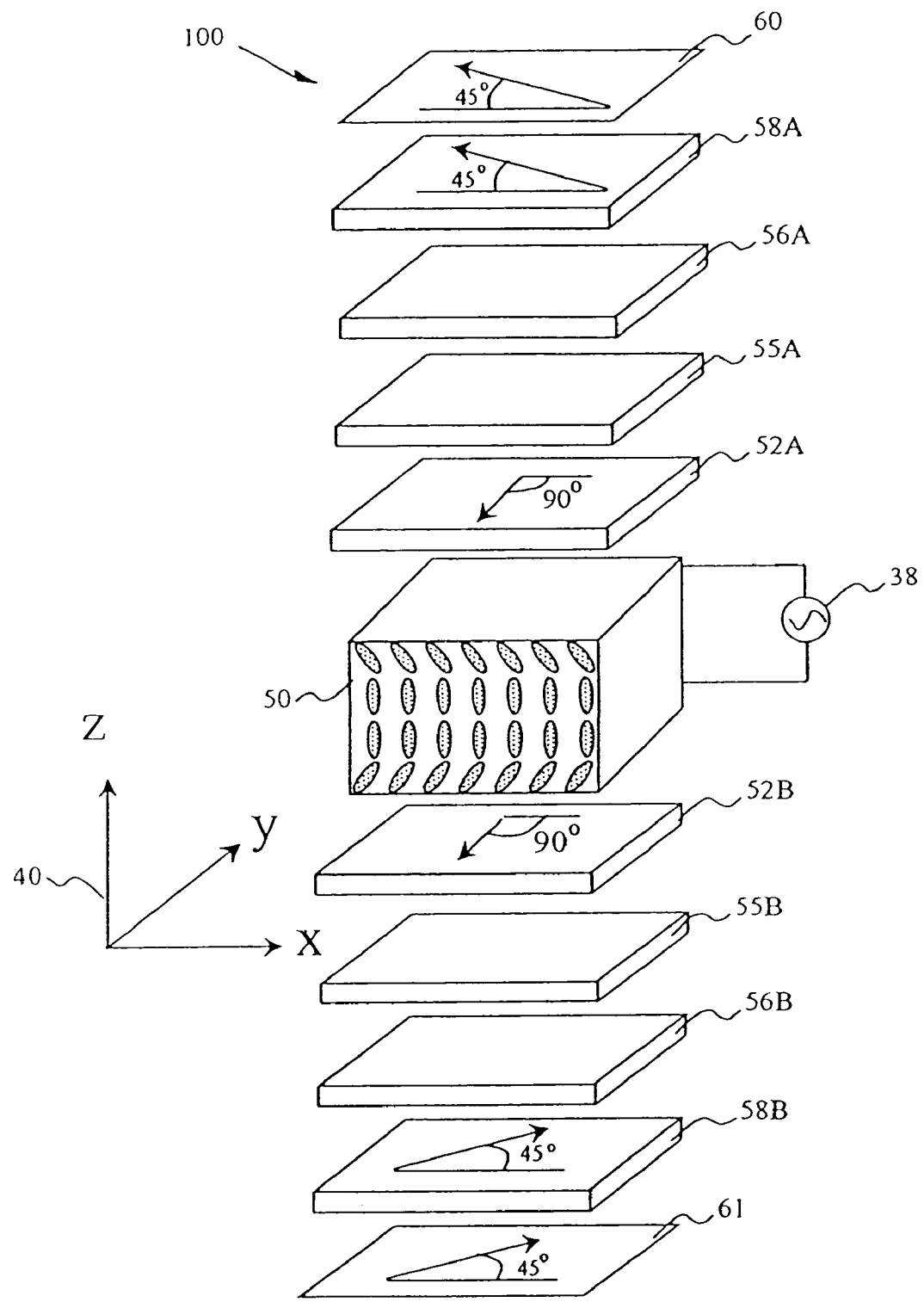
FIGS. 7A, 7B, and 7C illustrate embodiments of displays according to the invention.
Figure 7B:
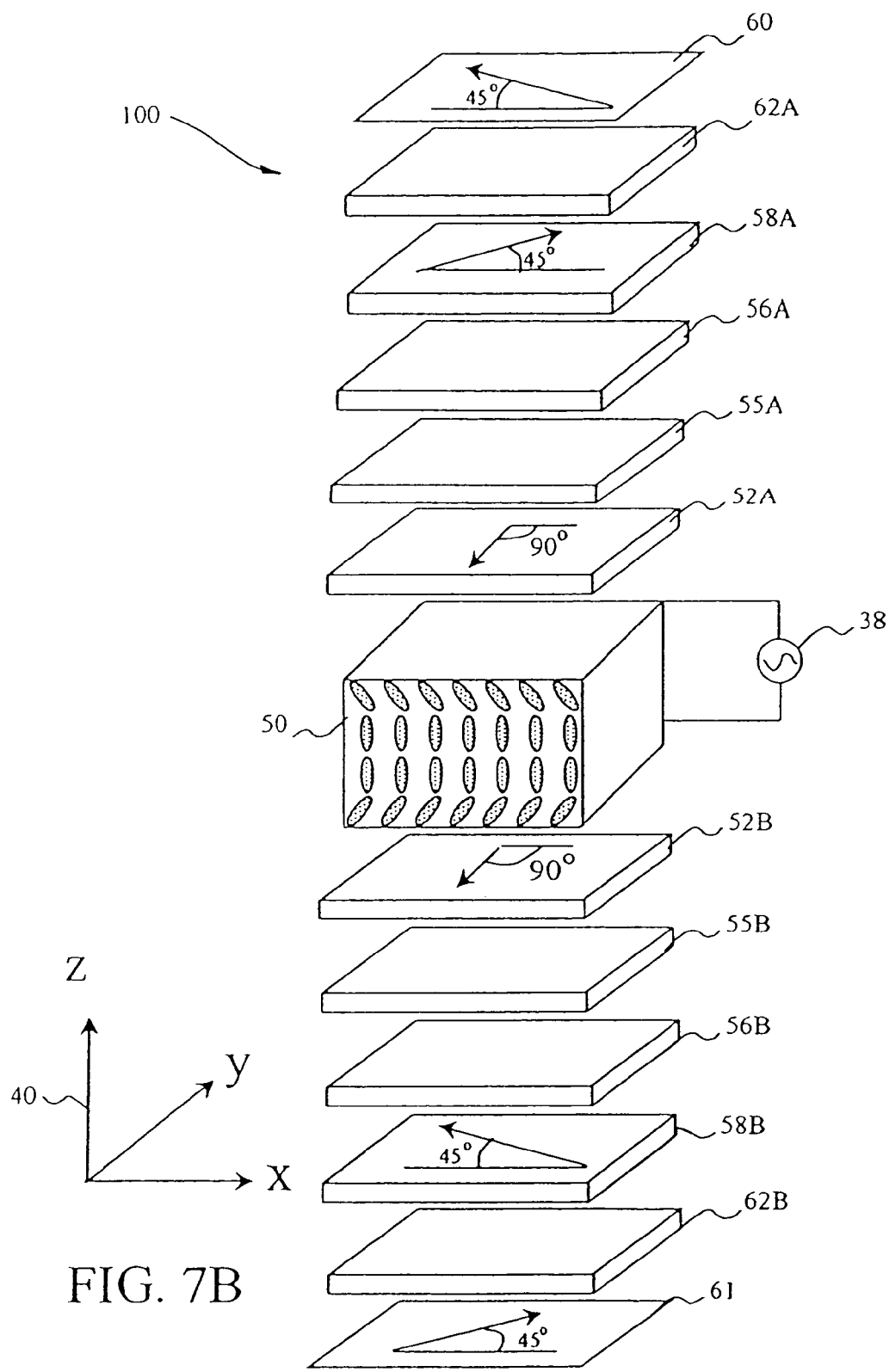
Figure 7C:
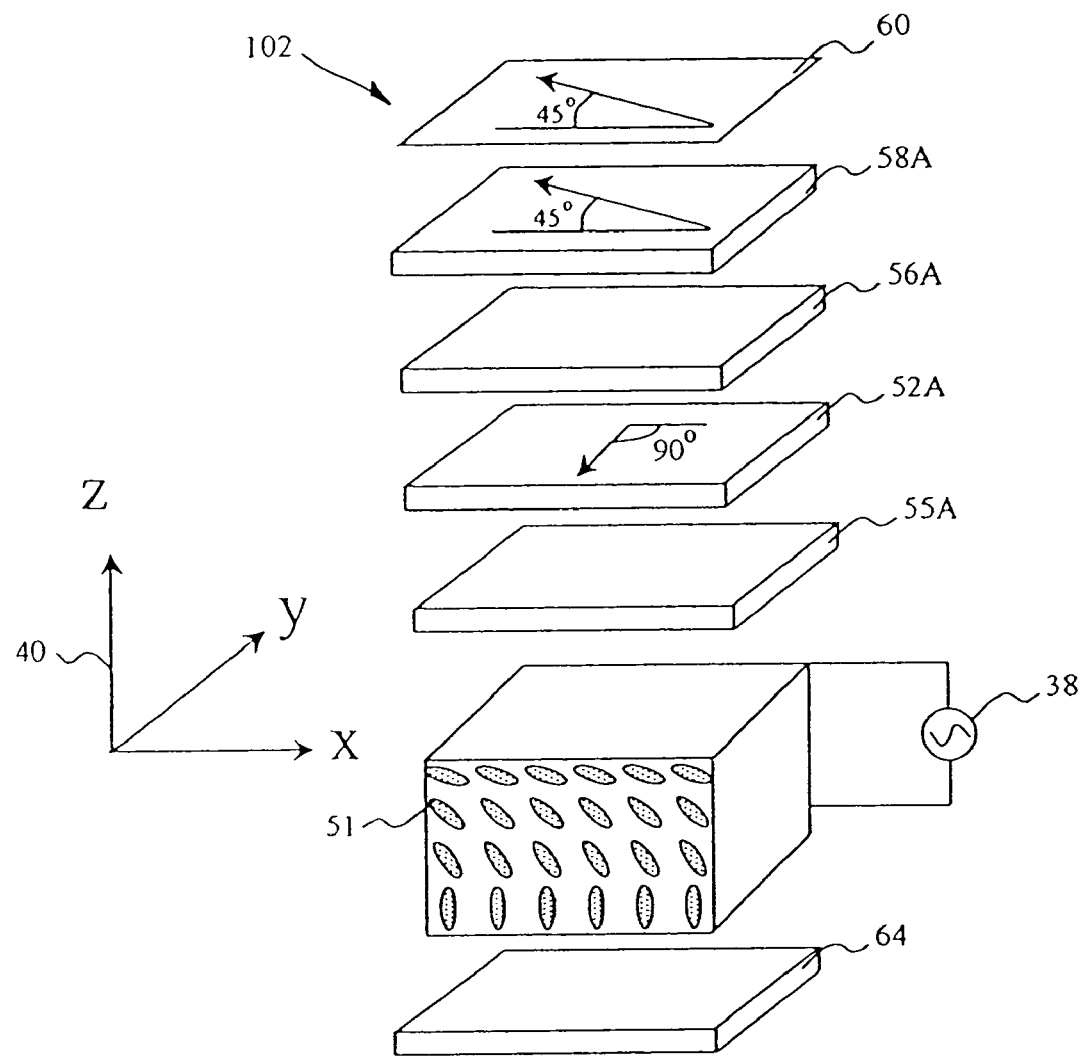

Three exemplary displays (100 and 102) according to the invention are shown in FIGS. 7A, 7B, and 7C, which correspond to the cross sectional schematics in FIGS. 3A, 3B, and 3D, respectively. Compensation films 55A and 55B are placed according to the positions shown in FIGS. 3A through 3D. In FIGS. 7A and 7B, the liquid crystals take the bend alignment in the X-Z plane in the bend aligned cell 50, while in FIG. 7C they take the hybrid orientation in the hybrid aligned cell 51. In both transmissive (FIGS. 7A and 7B) and reflective (FIG. 7C) modes, the mechanism of compensation is two fold: 1) a compensation of the bend aligned nematic liquid crystal cell, and 2) a compensation of the polarizer. As it was discussed by Chen et al. (SID 98 Digest, pp. 315–318 (1998)), crossed polarizers suffer a light leakage when viewed from an oblique angle. For the configuration shown in FIG. 7B, the pair of a positive C-plate 62A, 62B and a positive A-plate 58A, 58B compensates the crossed polarizer giving a dark state for all viewing angles. The combination of negative C-plates 56A, 56B and compensation films 55B, 55A compensates the cell 50. For FIG. 7A, the same principle applies. The reflective display 102 shown in FIG. 7C uses only one polarizer 60, one A-plate 58A, and one compensation film 56A containing positively birefringent material with the optic axis tilted, however, it is equivalent to the transmissive display 100 by adding a quarter waveplate (not shown) between the polarizer 60 and the HAN cell 51.

Figure 8A:
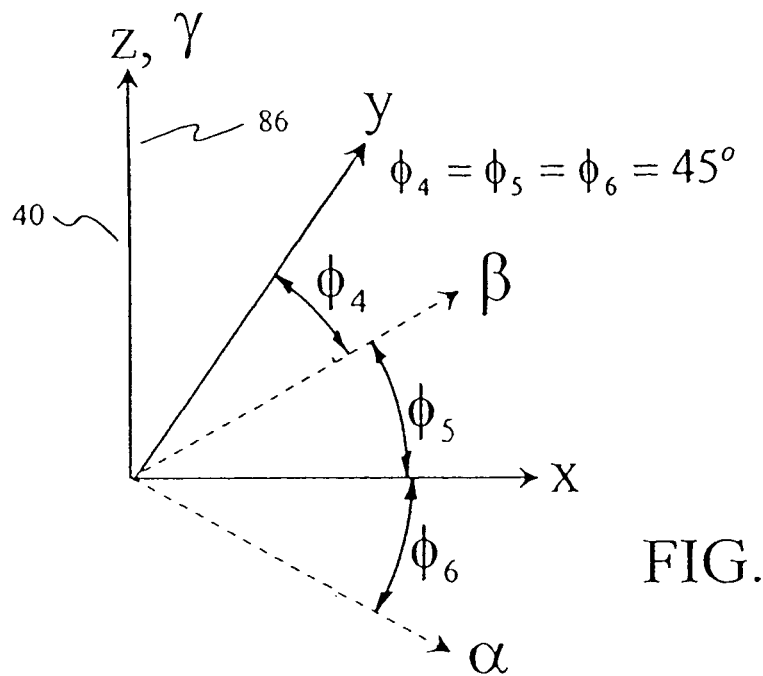
FIGS. 8A and 8B are diagrams of a compensation film placement with respect to the display.
Figure 8B:
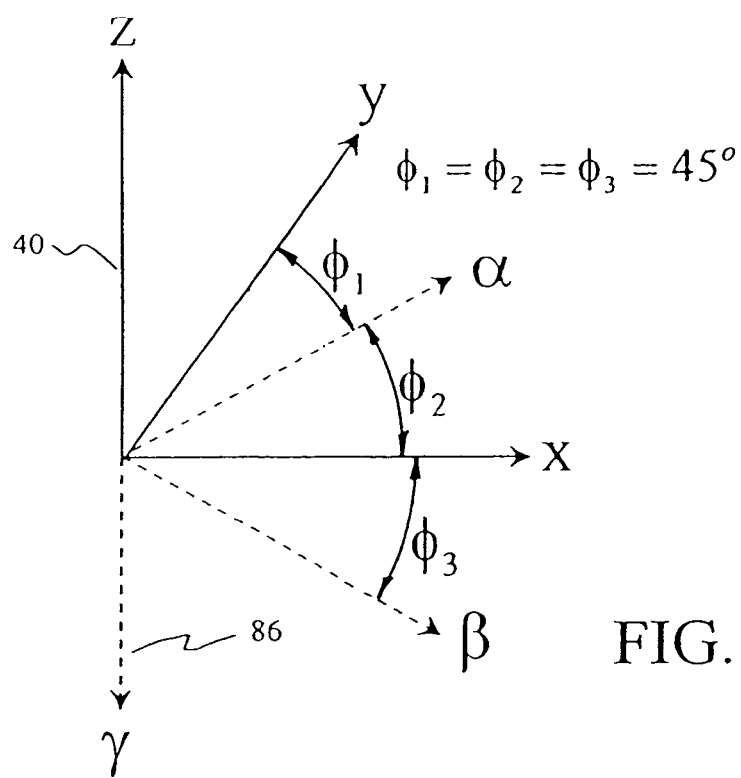

FIG. 8A and FIG. 8B show the placement of compensation films 55A, 55B with respect to the displays 100 and 102 shown in FIGS. 7A, 7B, and 7C. For a given compensation film 55 from FIGS. 5A, 5B, and 6A through 6D, the orthogonal coordinate system $\alpha$, $\beta$ and $\gamma$ 86 is to be placed in relation to the X-Y-Z coordinate 40 according to FIGS. 8A and 8B. FIG. 8B shows that in a compensation film 55B, the γ axis points down ward (anti-parallel to the positive Z direction) while the γ axis is parallel to the positive Z direction in the film 55A as shown in FIG. 8A. In both cases, the α, β, X, and Y axes are in the same plane perpendicular to the Z and γ axes and angles $\phi_1$ through $\phi_6$ between the α, β, X, and Y axes are all 45°. An ideal compensation is achieved when the compensation films 55 with the same configuration are used for both 55A and 55B. However, combinations of different film structures 55, such as those shown in FIGS. 5A and 5B, FIGS. 6A and 6B, FIGS. 6C and 6D, and FIGS. 5A and 6A, also compensate the cell 50. For a reflective type display 102 (see FIGS. 7C and 3D) using the HAN cell 51, the placement of the compensation film 55A follows that of FIG. 8A, namely, the γ axis in the film 55A is parallel to the positive Z direction as shown in FIG. 8A. Any film 55 from FIG. 5A through FIG. 6D can be used as 55A in FIGS. 7C and 3D.

Figure 9A:
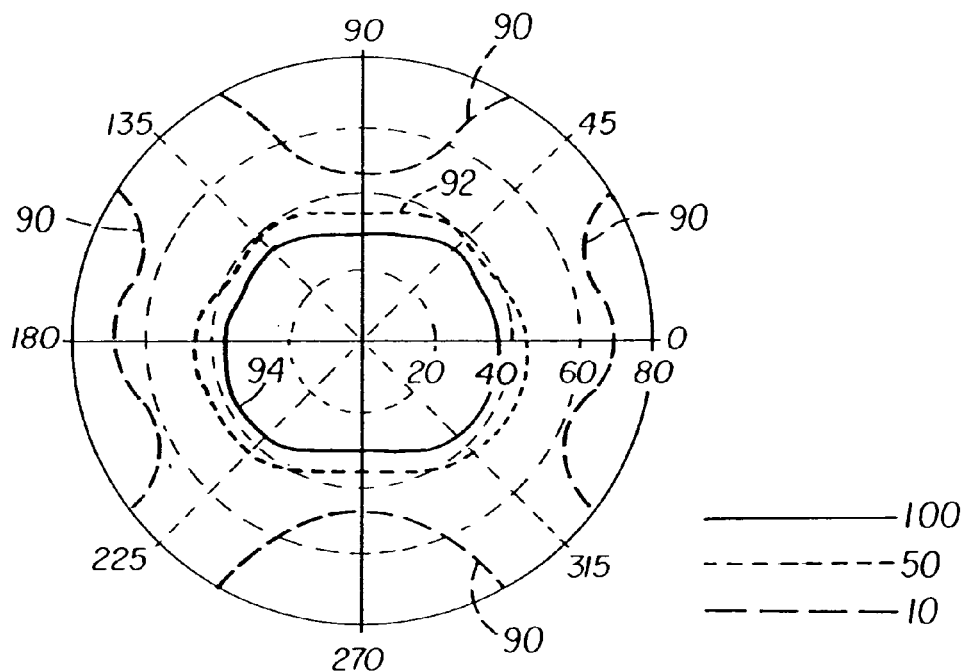
FIGS. 9A and 9B show the viewing angle characteristics of the displays as illustrated in FIGS. 7A and 7B, respectively.
Figure 9B:
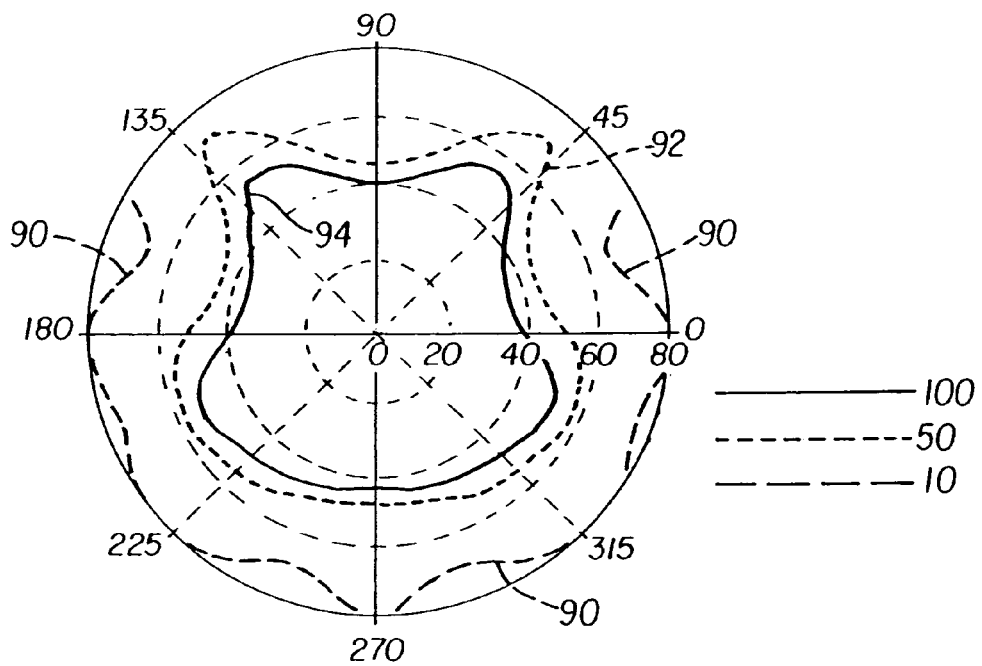

To characterize the VAC of the current invention, isocontrast plots for displays 100 configurations FIGS. 7A and 7B are shown in FIGS. 9A and 9B. For both cases, the inner structure of the compensation films 55A and 55B is that of compensation film 55 shown in FIG. 6C. Comparable results are obtained with other film structures, for example, one shown in FIG. 5A.

Isocontrast plots, FIGS. 9A and 9B, show the contrast ratio for a given viewing angle. The concentric circles indicate the polar angles and the lines in radial direction (0, 45, 90, 135, 180, 225, 270, 315 degree) correspond to the azimuthal angles of viewing. The center of the circles identifies the normal viewing. Inside of the solid line 94, one has contrast ratio higher than 100, and the short dashed line 92, higher than 50, and the long dashed line 90, higher than 10. FIG. 9A is an isocontrast plot of the display 100 configuration shown in FIG. 7A. The high contrast ratio 50 is extended to polar angle 40 degrees for most of the azimuth angle. Contrast ratio 10 and higher is achieved up to 70 degrees of polar angle in the horizontal (0–180 azimuth) and 50 degrees in the vertical (90–270 azimuth) direction. In the diagonal (45–225, 135–315 azimuth), the contrast ratio is higher than 10 throughout the polar angle range 0 to 80 degrees. The isocontrast plot for the display 100 configuration shown in FIG. 7B is shown in FIG. 9B. It has a better VAC than FIG. 9A.

The anisotropic layers 82 and 84 can be produced by various methods. One example is a photo-alignment method as was suggested by Schadt et al. (Japanese Journal of Applied Physics, Part 2 (Letters) v 34 n 6 1995 pp. L764–767). For example, a thin alignment layer is coated on the base film followed by a radiation of polarized light. A liquid crystal monomer is then coated on the alignment layer and polymerized by a further radiation. The tilt of optic axis in the anisotropic layer depends on the radiation angle, the thickness of anisotropic layers as well as properties of materials. Also, a desired alignment can be obtained by mechanically rubbing surface of the alignment layer. Other known methods employ shear forces orientations and the effect of an electric or a magnetic field.

In the following, preferable optical properties of the optical compensation film, such as the thickness and the optic axis tilt are given. As described above, the compensation scheme is two fold: first, to optically compensate the liquid crystal cell, and, secondly, to prevent light leakage from the crossed polarizers.

The cell can approximately be divided into two parts: A) the middle of the cell where the liquid crystal molecules are almost perpendicular to the substrates with an applied voltage and B) the cell boundary region where liquid crystals experience the bend distortion. The region A) is optically positive in the cell normal direction and its optical phase retardation, ΔR, is approximately, $$0.5(n_e - n_o)d \leq \Delta R \leq 0.9(n_e - n_o)d, \quad (1)$$

where $n_e$ and $n_o$ are the extraordinary and the ordinary indices of refraction for the liquid crystal, and d is the thickness of the cell. A film with −ΔR or two films with −ΔR/2 is needed for compensating this part. In all exemplary displays 100, two films such as 56A, 56B are placed on both sides of the liquid crystal cell. The region B) is to be compensated by the film with the anisotropic layers such as the ones in FIGS. 5A, 5B and 6A through 6D. The optimization of crossed polarizers requires a combination of in-plane and out of plane phase retardation $\Delta R_a$ and $\Delta R_c$. In the example FIG. 7A, $\Delta R_a$ is preferably between 80 nm<$\Delta R_a$<100 nm, or more preferably, 85 nm<$\Delta R_a$<95 nm. For $\Delta R_c$, it is 60 nm<$\Delta R_c$<80 nm or more preferably, 65 nm<$\Delta R_c$<75 nm. The phase retardation −$\Delta R_T$ of the negative C-plate is then approximately given by −$\Delta R_T$=−ΔR/2+$\Delta R_c$ but values of −$\Delta R_T$ satisfying 1.2(−ΔR/2+$\Delta R_c$)<−$\Delta R_T$<0.8(−ΔR/2+$\Delta R_c$) are also acceptable. In case of FIG. 7B, $\Delta R_a$ is preferably between 130 nm<$\Delta R_a$<150 nm or more preferably, 135 nm<$\Delta R_a$<146 nm. And the phase retardation of the positive C-plate $\Delta R_c$ is between 35 nm<$\Delta R_c$<55 nm or more preferably 43 nm<$\Delta R_c$<50 nm. The phase retardation −ΔRc' of the negative C-plate is approximately equal to −ΔR/2 but can be also between −1.2ΔR/2<−ΔRc'<−0.8ΔR/2.

Figure 6D:
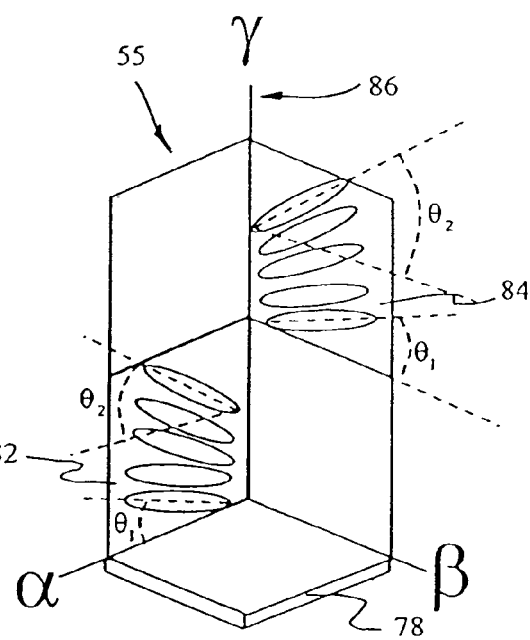

The optic axis can have a uniform (FIGS. 5A and 5B) or a varying tilt (FIGS. 6A, 6B, 6C and 6D). For the uniform case, the angle of tilt $\theta_1$ is between 20°≦$\theta_1$≦70° or more preferably 40°≦$\theta_1$≦60°. When the tilt is varying, there are two cases; 1) a decreasing tilt ($\theta_1$>$\theta_2$) in the positive γ direction (FIGS. 6A and 6B) and an increasing tilt ($\theta_1$<$\theta_2$) (FIGS. 6C and 6D). In the decreasing case, $\theta_1$ and $\theta_2$ are between 50°≦$\theta_1$≦90°, 5°≦$\theta_2$≦40° or more preferably 60°≦$\theta_1$≦85°, 5°≦$\theta_2$≦20°. The increasing case is just opposite, namely, $\theta_1$ and $\theta_2$ are between 5°≦$\theta_1$≦40°, 50°≦$\theta_2$≦90° or more preferably, 5°≦$\theta_1$≦20°, 60°≦$\theta_2$≦85°. The thickness of the anisotropic layer depends on the cell operating voltage, cell parameters, material used and other factors.

The invention may be used in conjunction with electronic liquid crystal display devices. The energy required to achieve this control is generally much less than that required for the luminescent materials used in other display types such as cathode ray tubes. Accordingly, liquid crystal technology is used for a number of applications, including but not limited to digital watches, calculators, portable computers, electronic games for which light weight, low power consumption and long operating life are important features.

In the following examples, a liquid crystal ZLI-1132 from Merck Inc. is used. The cell thickness is 8.57 micron, which makes $(n_e-n_o)d$=1200 nm. The pre-tilt at the substrates in the OFF state is 5° measured from the cell plane. The ON state is obtained when the applied voltage is around 7.60 volts.

EXAMPLE 1

This embodiment is according to the display 100 shown in FIG. 7A. Compensation films 55A, 55B having the film 55 structure shown in FIG. 6C with $\theta_1$=5° and $\theta_2$=85° are used. The anisotropic layers 82 and 84 contain a positively birefringent material with $n_3$=1.63 and $n_1$=$n_2$=1.53 at the wavelength of 550 nm. The optic axis in the anisotropic layers 82 and 84 varies from $\theta_1=5°$ to $\theta_2=85°$ along the thickness direction with the average tilt around 45°. The thickness of each anisotropic layer is 0.5 micron. Positive A-plates 58A and 58B have in-plane retardation $\Delta R_a$ of 90 nm and their optic axes are parallel to the transmission axes of their nearer polarizers 60 and 61, respectively. Negative C-plates 56A, 56B have phase retardation $\Delta R_T$ equal to –375 nm. The second positive A-plates 52A, 52B have their optic axes oriented in the Y-direction with phase retardation of 29 nm. The VAC is given in FIG. 9A in terms of an isocontrast plot. As described above referring to FIG. 9A, the display 100 shows a wide viewing angle characteristic.

EXAMPLE 2

This embodiment is according to the display 100 shown in FIG. 7B. Compensation films 55B, 55A having the film 55 structure shown in FIG. 6C with $\theta_1=35°$ and $\theta_2=65°$ are used. Again, the anisotropic layer 82 and 84 contain a uniaxial material with $n_3=1.63$ and $n_1=n_2=1.53$ at the wavelength of 550 nm. The thickness of each layer is 0.5 micron. The average tilt in the anisotropic layer is around 55°. Positive C-plates 62A, 62B have out of plane retardation $\Delta R_c$ of 47 nm. Positive A-plates, 58A and 58B, have in-plane phase retardation $\Delta R_a$ of 141 nm and their optic axes are perpendicular to the transmission axes of their nearer polarizers, 60 and 61, respectively. Negative C-plates 56A, 56B have phase retardation $-\Delta Rc'=-475$ nm. The second positive A-plates 52A, 52B have their optic axes oriented in the Y-direction with phase retardation of 29 nm. A wide viewing angle characteristic is achieved as given in FIG. 9B in terms of an isocontrast plot.

The invention has been described in detail with particular reference to certain preferred embodiments thereof, but it will be understood that variations and modifications can be effected within the scope of the invention.

The entire contents of the patents and other publications referred to in this specification are incorporated herein by reference.

PARTS LIST

| | |
|---|---|
| 10 | cell substrates |
| 12 | liquid crystals |
| 13 | reflective plate |
| 14 | ray from left to right |
| 16 | ray from right to left |
| 17A, 17B | ray in a reflective display |
| 18 | the bottom part of the OCB cell |
| 19 | the bottom part in a HAN cell |
| 20 | mid-plane of the cell |
| 22 | XYZ coordinate system |
| 24 | the upper part of the OCB cell |
| 25 | the top part in a HAN cell |
| 28 | direction of applied field |
| 32 | polarizer |
| 34 | biaxial plate |
| 36 | ellipsoid of index representing the biaxial film 34 |
| 38 | voltage source |
| 40 | XYZ coordinate system |
| 42 | polarizer |
| 50 | bend aligned nematic liquid crystal cell |
| 51 | hybrid aligned nematic liquid crystal cell |
| 52A, 52B | positive A-plate with optic axis in Y-direction |
| 55A | compensation film |
| 55B | compensation film |
| 55 | compensation film |
| 56A, 56B | negative C-plate |
| 58A, 58B | positive A-plate with optic axis perpendicular or parallel to the transmission axis of polarizers 60, 61 |
| 60 | polarizer |
| 61 | polarizer |
| 62A, 62B | positive C-plate |
| 64 | reflective plate |
| 70 | ellipsoid of index representing the constituent materials of anisotropic layers 82, 84 |
| 72 | film containing base film 78 and anisotropic layer 82 |
| 74 | optic axis of constituent material of anisotropic layer 82 |
| 78 | base film |
| 80 | film containing base film 78 and anisotropic layer 82 |
| 82 | bottom anisotropic layer in contact with the base film 78 |
| 84 | top anisotropic layer |
| 86 | $\alpha\beta\gamma$ orthogonal coordinate system attached to the compensation film 55 |
| 90 | isocontrast line 10 |
| 92 | isocontrast line 50 |
| 94 | isocontrast line 100 |
| 98 | prior art display |
| 100 | display according to the invention |
| 102 | display according to the invention |
| $\theta_1$ | tilt angle |
| $\theta_2$ | tilt angle |
| $\phi_1$ | angle between the $\alpha$ and Y axes |
| $\phi_2$ | angle between the $\alpha$ and X axes |
| $\phi_3$ | angle between the $\beta$ and X axes |
| $\phi_4$ | angle between the $\beta$ and Y axes |
| $\phi_5$ | angle between the $\beta$ and X axes |
| $\phi_6$ | angle between the $\alpha$ and X axes |

What is claimed is:

1. A display comprising a bend aligned nematic liquid crystal cell, a pair of polarizers, one disposed on each side of the bend aligned nematic liquid crystal cell, the polarizers having transmission axes orthogonally crossed with respect to each other, and a compensation film disposed between the bend aligned nematic liquid-crystal cell and each polarizer, said film containing a positively birefringent material oriented with its optic axis tilted in a plane perpendicular to the liquid crystal cell surface plane, wherein the compensation films comprise a first positively birefringent material disposed on a base film and a second positively birefringent material disposed on the said first positively birefringent material, wherein the first and second positively birefringent materials each have their optical axes in planes that are perpendicular to the liquid crystal cell and the planes are perpendicular to each other.

2. A display according to claim 1 wherein two positively birefringent material layers have different thickness.

3. A display according to claim 1 wherein tilt in the optic axis of at least one of positively birefringent material layers is uniform.

4. A display according to claim 1 wherein tilt in the optic axis of at least one of positively birefringent material layer varies.

5. A display according to claim 1 comprising an alignment layer between the first positively birefringent layer and the base film.

6. A display according to claim 1 wherein the tilt in the optic axis of the compensation film is uniform.

7. A display according to claim 1 wherein the tilt in the optic axis of the compensation film varies.

* * * * *